(12) United States Patent
Lee

(10) Patent No.: US 9,688,333 B2
(45) Date of Patent: Jun. 27, 2017

(54) DIRECTION INDICATE LAMP FOR BICYCLE WITH MULTI-FUNCTION

(71) Applicant: Sang-lae Lee, Gyeonggi-do (KR)

(72) Inventor: Sang-lae Lee, Gyeonggi-do (KR)

(73) Assignee: Sang-lae Lee, Gyeonggi-do (KR)

( * ) Notice: Subject to any disclaimer, the term of this patent is extended or adjusted under 35 U.S.C. 154(b) by 0 days.

(21) Appl. No.: 14/419,884

(22) PCT Filed: Jun. 24, 2014

(86) PCT No.: PCT/KR2014/005552
§ 371 (c)(1),
(2) Date: Feb. 5, 2015

(87) PCT Pub. No.: WO2015/072644
PCT Pub. Date: May 21, 2015

(65) Prior Publication Data
US 2016/0257366 A1    Sep. 8, 2016

(30) Foreign Application Priority Data

Nov. 14, 2013  (KR) .......................... 10-2013-0138573
Nov. 14, 2013  (KR) .......................... 10-2013-0138574

(51) Int. Cl.
*B62J 6/00*    (2006.01)
*B62J 6/16*    (2006.01)
*B62J 6/04*    (2006.01)

(52) U.S. Cl.
CPC ................. *B62J 6/16* (2013.01); *B62J 6/003* (2013.01); *B62J 6/005* (2013.01); *B62J 6/04* (2013.01); *B62J 2300/008* (2013.01)

(58) Field of Classification Search
CPC ..... B62J 6/005; B62J 6/003; B62J 6/04; B62J 6/02; B62J 6/16; B60Q 1/34
USPC .......................................................... 362/473
See application file for complete search history.

(56) References Cited

U.S. PATENT DOCUMENTS 7,481,560 B1 *  1/2009  Jaw ........................... B62J 6/00
                                                            16/421
2007/0278072 A1 * 12/2007  Tozuka .................... B60Q 1/40
                                                            200/61.3

FOREIGN PATENT DOCUMENTS

| JP | 2004-530586 | 10/2004 |
| JP | 2005-022642 | 1/2005 |
| KR | 2020100006401 | 6/2010 |
| KR | 1020110082376 | 7/2011 |
| KR | 101209368 | 12/2012 |
| KR | 2020130003812 | 6/2013 |

* cited by examiner

Primary Examiner — Karabi Guharay
(74) Attorney, Agent, or Firm — I P & T Group LLP

(57) ABSTRACT

Provided is a multi-functional turn signal lamp for a bicycle that can be used in a state of being fixed or being detachably attached to an end portion of a handle bar of the bicycle, can perform a turn indicator function, a front lighting function or a brake signaling function via LEDs mounted at the end portion of the handle bar and can enable a user to listen to music via a speaker using the power of a battery upon inserting a portable repository. Also, the present invention can enable a turn indicator lamp composed of an LED part (6) to be operated, or a brake lamp function to be performed by selectively pushing each key of a key part (4) and can enable a module (22) to be separated from a grip part (37), and the grip part (37) to be tightly fixed to the handle bar (50).

9 Claims, 19 Drawing Sheets

DIRECTION INDICATE LAMP FOR BICYCLE WITH MULTI-FUNCTION

This application is a national stage application of PCT/KR2014/005552 filed on Jun. 24, 2014, which claims priorities of Korean patent application numbers 10-2013-0138573 and 10-2013-0138574 filed on Nov. 14, 2013. The disclosure of each of the foregoing applications is incorporated herein by reference in its entirety.

TECHNICAL FIELD

The present invention relates to a multi-functional turn signal lamp for a bicycle, more particularly, to a multi-functional turn signal lamp for a bicycle that can be used in a state of being fixed or detachably attached to an end portion of a handle bar of the bicycle and can multiply perform a turn indicator function or a brake signaling function, a front lighting function or an on-and-off lighting function for signaling a user's position because multiple and multi-line LEDs (Light Emitting Diode) are mounted. Furthermore, the multi-functional turn signal lamp can obtain a width indicator effect of the bicycle from LED lighting so that it can enable the user to easily distinguish forward and backward objects and can enable the use of a portable repository and charging of a portable device.

BACKGROUND ART

Recently, as many bicycle paths have been opened, the people who ride a bicycle are increasing. However, a handle bar of a conventional bicycle provides merely a simple function to a rider with regard to adjusting a direction of the bicycle because a grip part is only simply installed at the handle bar.

Thus, the conventional bicycle has no means for signaling a rider's moving direction to another rider who comes on from the front or the back.

That is, in the case of a car, since a turn signal lamp is installed at the car, a rider can easily signal his or her driving direction to another rider who comes on from the back via a means for turning on and off the right or left turn signal lamp. However, it is problematic in that the bicycle has no means for signaling the rider's driving direction to another rider who comes on from the back.

Also, even though a turn signal lamp of the conventional bicycle is presented, it is for a user difficult to distinguish directions because such a turn signal lamp has a small width.

In particular, it is difficult for the existing turn signal lamp to substantially control or display a direction upon sudden stop or stop because there is no brake lamp, and thus there is the high risk of a rear collision.

DISCLOSURE

Technical Problem

Accordingly, the present invention has been made keeping in mind the above problems occurring in the prior art. An object of the present invention is to provide a multi-functional turn signal lamp that can be used in a state of being fixed or being detachably attached to an end portion of an existing handle bar of a bicycle by mounting a battery thereto, wherein the battery can be charged even in a state of the turn signal lamp being separated from the handle bar in the case where the turn signal lamp is detachably attached to the handle bar. Furthermore, by installing multiple and multi-row LEDs, the multi-functional turn signal lamp for the bicycle can perform complex functions such as a direction indicating function, a front lighting function, a brake lamp function, a speed controlling function and the like.

Also, another object of the present invention is to provide a multi-functional turn signal lamp for a bicycle, which is configured such that, in a case where the people ride each bicycle as a group, each LED part 6 may be installed to emit a specific beam having the same color so that the group can be distinguished from other riders or groups, and riding can be entirely controlled and led, thereby enabling stable group riding.

In particular, a further object of the present invention is to provide a multi-functional turn signal lamp for a bicycle capable of increasing a width indicator effect of the bicycle resulting from turning on of a lighting lamp and visual images for stop signals and stability, and capable of selecting a night lighting function by adopting LEDs arranged at both sides of a front portion as high luminance LEDS for controlling intensity.

Also, yet another object of the present invention is to provide a multi-functional turn signal lamp for a bicycle that is convenient to operate because the turn signal lamp is located at a handle bar, and has a lighting function showing a light source width largely improved compared to that shown from an existing lighting function because beams are irradiated from each outside of both sides of the handle bar, the multi-functional turn signal lamp irradiating a beam upon changing a direction.

Technical Solution

In order to accomplish the above objects, the present invention provides a multi-functional turn signal lamp for a bicycle that is configured to be fixed to an end portion of a handle bar of an existing bicycle and is able to be charged via a charging terminal by separating a module embedded with a battery, wherein a light source display arranged at the end portion of the handle bar is made of acrylic (translucent PC) and the like, and multiple LEDs are installed so as to irradiate beams to the front or so as to serve as a turn signal lamp.

Also, the present invention provides a multi-functional turn signal lamp for a bicycle that can enable a user to listen music or can receive a power source by installing a charging terminal, a portable device terminal and a speaker for additional functions.

Advantageous Effects

According to the present invention, it is advantageous in that a multi-functional turn signal lamp for a bicycle according to the present invention can be used in a state of being fixed or being detachably attached to an end portion of a handle bar of an existing bicycle, a turn signal lamp and a signal sound can be simultaneously operated, or turning on and off (emergency/warning) and speed accelerating or decelerating signals can be displayed by pushing a suitable key upon riding the bicycle, and an audiovisual effect for enabling lighting of a brake lamp and the generation of a warning sound carn be generated when a rider holds on to a brake lever of the handle bar.

Also, according to the present invention, it is advantageous in that a width indicator effect of a bicycle and visual images for stop signal and stability can be increased by turning on of a lighting lamp when a rider rides the bicycle at night, and a night lighting function can be selected by adopting LEDs arranged at both sides of a front portion as high luminance LEDs for controlling intensity.

Also, according to the present invention, it is advantageous in that a portable device can be continuously used via a charging terminal installed at a key part using a connection jack even upon discharge of the interchangeable portable device such as a smart phone.

Also, the present invention can enable a module to be easily separated from a grip part by simply pulling a ring installed at a lock cover.

Also, the present invention can enable a rider to listen to music by inserting a memory containing a sound source desired by the rider into an insertion terminal because the insertion terminal for a portable repository is installed, and can enable the user to listen to music via a portable music player such as a smart phone or the like.

DESCRIPTION OF DRAWINGS

FIG. 1 is a block diagram of the present invention;

FIG. 2 is a cross-sectional view showing a combination state of a turn signal lamp for a bicycle of the present invention;

FIG. 3 is a perspective view showing a state in which a stopper part of the present invention is separated from a grip part;

FIG. 4 is a view showing a state in which a charging terminal and a movable reservoir inserting part are formed in the stopper part;

FIG. 5 is a view illustrated for explaining a state in which the grip part is detachably attached into a handle bar;

FIG. 6 is a view showing a detailed configuration of an LED part of the present invention;

FIG. 7 is a view showing a lighting state of the LED part according to each case of the present invention;

FIG. 8 is a view showing hand signals applied to the bicycle of the present invention;

FIG. 9 is a view showing a flat bar form and a drop bar form of the bicycle to which the present invention is applied;

FIG. 10 is a block diagram according to the exemplary embodiment of the present invention;

FIGS. 11 and 12 are a view illustrated for explaining operational states of a head lamp, a brake lamp and a turn signal lamp, and a flow chart showing an operation for controlling an operational state of power and the head lamp;

FIG. 13 is a view illustrated for explaining an internal structure of a grip part of the present invention;

FIG. 14 is a view showing a hook locking state of the present invention;

FIG. 15 is a view showing a hook unlocking state of the present invention;

FIG. 16 is a view showing a hook locking state in a lock assembly structure of the present invention;

FIG. 17 is a view showing a hook unlocking state in the lock assembly structure of the present invention;

FIG. 18 is a view showing a waterproof structure of the lock assembly of the present invention;

FIGS. 19 and 20 are views showing a waterproof structure of the present invention;

FIG. 21 is a view showing a combination structure of a module probe pin and the grip part of the present invention;

FIGS. 22 and 23 are views showing a coupling structure of a clamp and the grip part of the present invention;

FIG. 24 is a view showing an insert molding structure to which an FPCB (Flexible Printed Circuit Board) and the grip part of the present invention are applied;

FIG. 25 is a view showing an operational assembly structure for a key of the grip part of the present invention;

FIG. 26 is a view showing a circular ring having an elastic piece at the end of a module of the present invention;

FIGS. 27 to 30 show a third exemplary embodiment according to the present invention, namely, FIG. 27 is an exterior view of the grip part having a key portion of the present invention;

FIG. 28 is a view showing an internal configuration of the module and the grip part of the present invention;

FIG. 29 is a view showing a process for separating the grip part from the module via a hook on-and-off function of the present invention; and FIG. 30 is a view showing a waterproof structure of the present invention.

BEST MODE

A first exemplary embodiment of the present invention will be hereinafter described in detail with reference to accompanying FIGS. 1 to 9.

Figure 1:
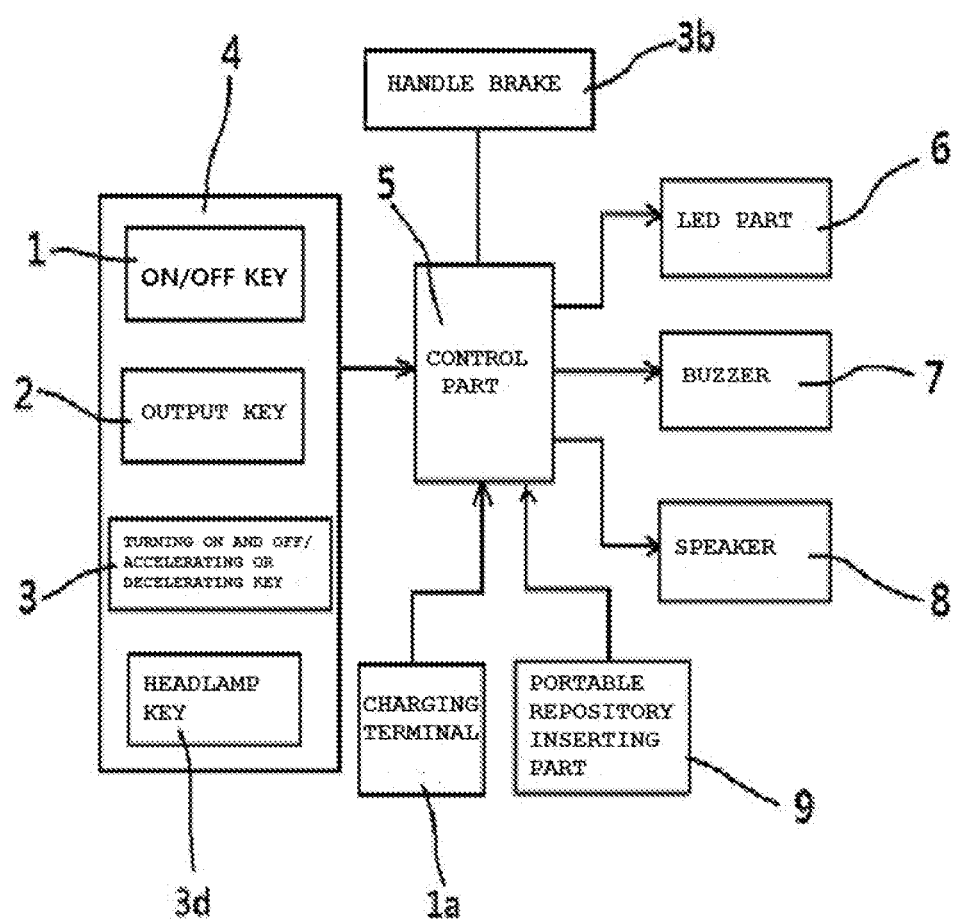
FIGS. 1 to 9 show a first exemplary embodiment of the present invention, namely.

FIG. 1 is a block diagram of the present invention. A turn signal lamp for a bicycle according to the present invention includes: a key part having an on/off key 1, an output key 2, a turning on and off/accelerating or decelerating key 3, and a headlamp key 3*d*; a handle brake 3*b* performing a stop function when a user holds on to a handle bar of the bicycle; a control part 5 performing corresponding control according to a signal inputted from a key part 4 and the handle brake 3*b*; a multi-LED part 6 turned on and off or by the control of the control part 5; a buzzer 7 generating a warning sound by the control of the control part 5; a speaker 8 generating a sound by the control of the control part 5; and a portable repository inserting part 9 connected to the control part 5 to transmit or receive a signal.

The on/off key 1 is composed as an alternating key in which turning on is performed when the on/off key is pushed once, and turning off is performed when the on/off key is pushed once again.

When the on/off key 1 is pushed once for turning on, LEDs 6*a*, 6*c* of the LED part 6 are turned on, thereby showing a side light. At this time, LED 6*c* is in a tail lamp state (see FIG. 6).

Furthermore, the on/off key 1 may enable a user to listen to music when the output key 2 is pushed in an on state. When the turning on and off/accelerating or decelerating key 3 is selectively pushed, the LEDs 6*a* are turned off, thereby showing a warning or emergency state. When the decelerating key is pushed, the LED is slowly turned on and off from top to bottom, and when the accelerating key is pushed, the LED is rapidly turned on and off, thereby showing acceleration.

At this time, it is preferable that a turn on and off speed rate between the acceleration and deceleration be 1:2 or 1:3, and the turn on and off speed rate is composed so that a suitable signal sound can be generated according to each circumstance.

The turn signal lamp according to the present invention is configured such that when the headlamp key 3*d* is pushed, a high luminance LED 6*b* is turned on, and when the user holds on to the handle brake 3*b*, the brake lamp 6*c* is only turned on.

Furthermore, the LED part 6 is installed at a circumferential portion of an inner circle of a cover 16 to have regular intervals or multi-rows.

Figure 2:
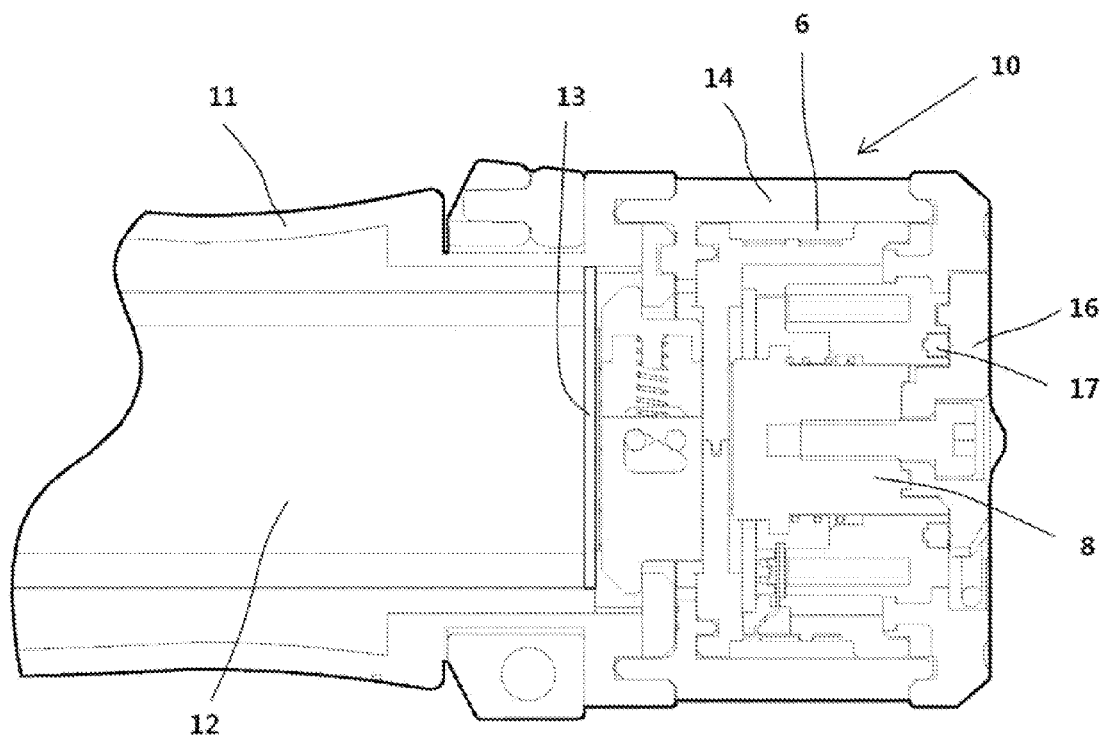
Figure 3:
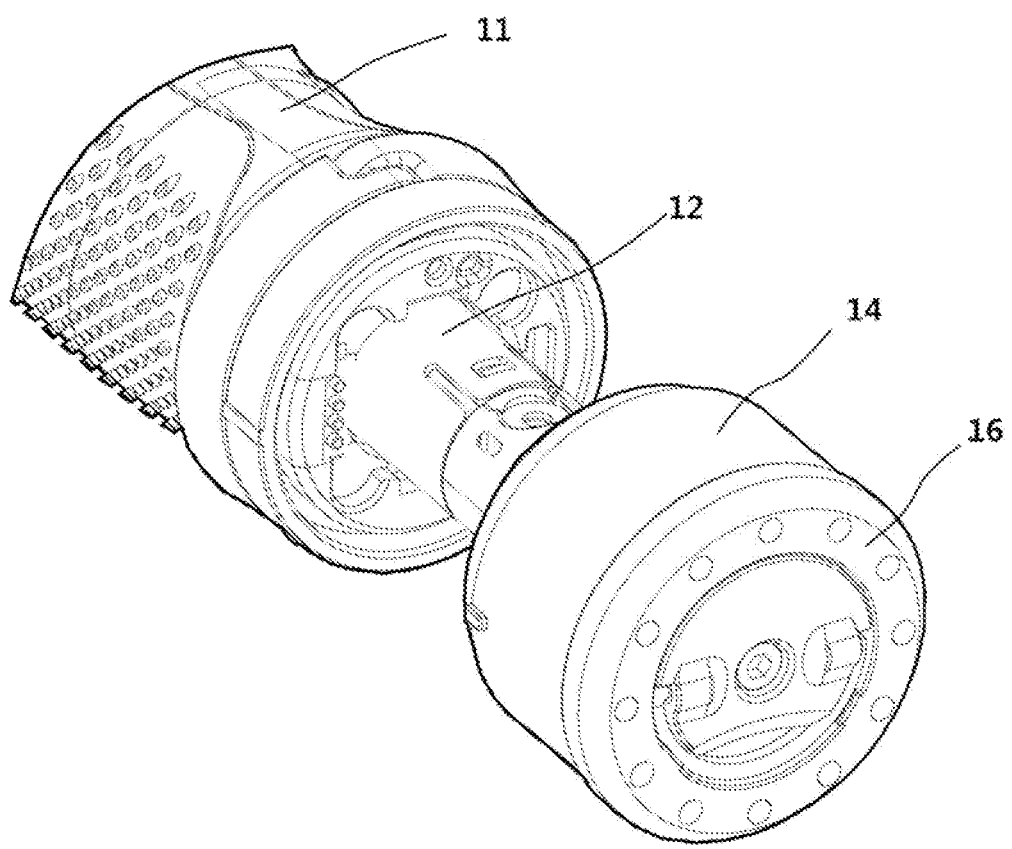
Figure 4:
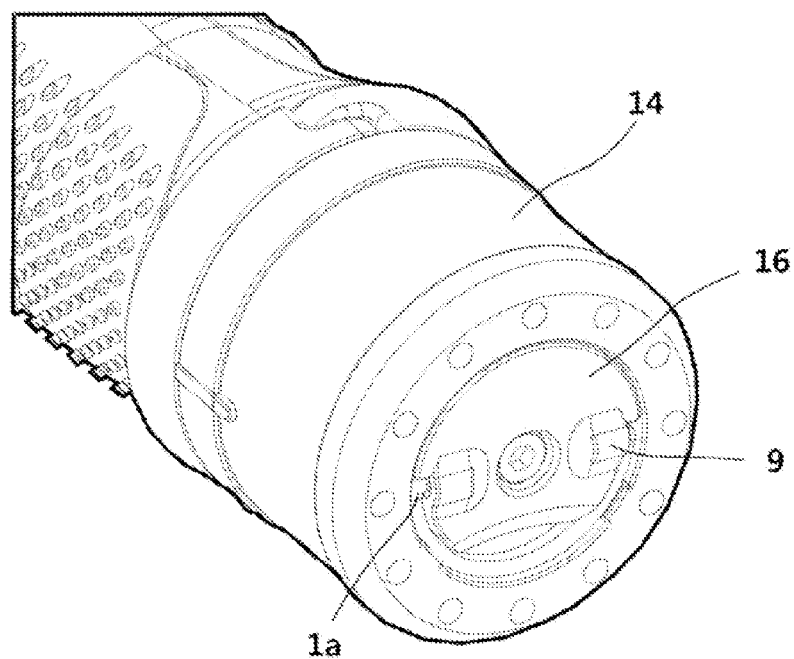

FIG. 2 is a cross-sectional view showing a combination state of the present invention, and FIGS. 3 and 4 are views showing a state in which a grip part 11 is incorporated into or is separated from the handle bar 10. The turn signal lamp includes: the grip part 11 formed to be insertable into the handle bar of the existing bicycle; a battery part 12 electrically connected to a terminal installed to be embedded in the grip part 11; a substrate 13 connected to the battery part 12; an LED part 6 connected to the substrate 13 and having multiple LEDs; a cover 16 in which a speaker 8 is installed; a lighting part 14 formed to enable a beam of the LED part 6 to go through an outer side; and a key part installed at the grip part 11. Reference numeral 17, which is not described in the drawings, refers to a waterproofing O-ring.

Figure 5:
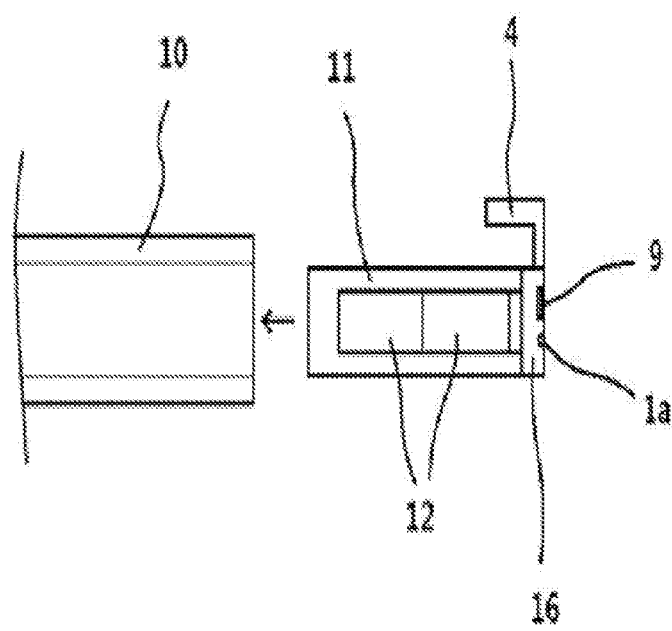

FIG. 5 is intended to explain a state in which the grip part 11 is detachably attached into the handle bar 10. However, since the key part 4 may be formed in the cover 16, it is preferable that the key part 4 be installed to come into contact with and to be fixed to an upper surface of the handle bar 10 upon inserting the grip part into the handle bar 10. A charging terminal 1*a* and the portable repository inserting part 9 may be installed at the cover 16.

Figure 6:
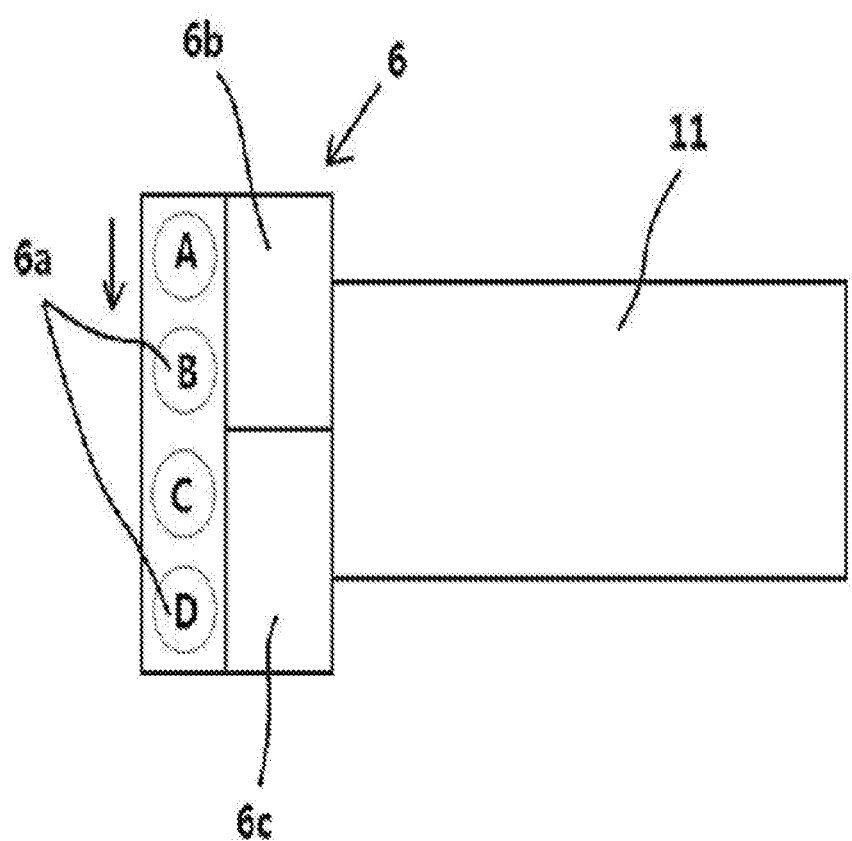
Figure 7:
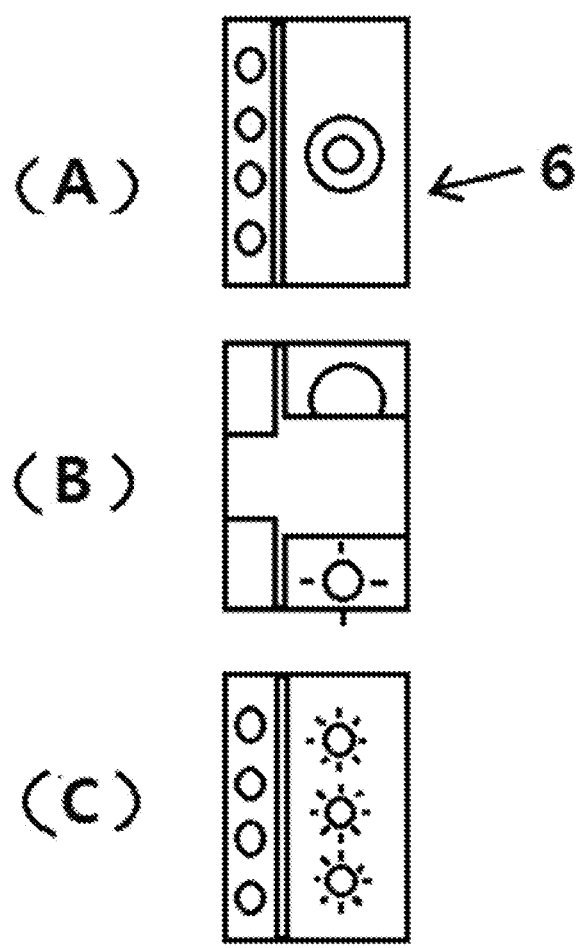
Figure 8:
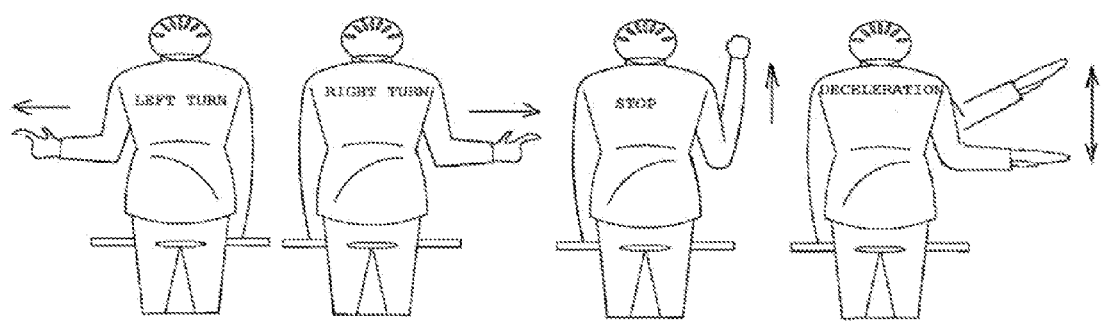

FIGS. 6 and 7 show a configuration and a turned-on state of the LED part and FIG. 8 is a view showing hand signals applied to the bicycle of the present invention.

Figure 9:
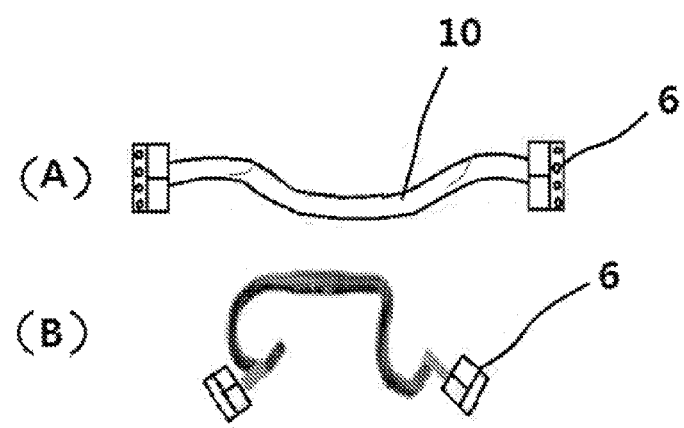

FIG. 9 is a view showing a flat bar form A and a drop bar form B of the handle bar of the bicycle to which the turn signal lamp according to the present invention is applied.

A length on one side of the LED part 6 of the present invention from the center of the handle bar 10 may range from 100 to 500 rm.

The operation of the present invention configured as descried above will be described.

With regard to the existing handle bar of the bicycle, the turn signal lamp may be fixed to the handle bar 10 and may be used in a state of a battery being mounted. In a case where the turn signal lamp is detachably attached to the handle bar, as shown in FIG. 5, the turn signal lamp may be used in a state of an existing handle made of a rubber material arranged at the end of the handle bar 10 being removed, and the grip part 11 of the present invention being inwardly inserted into the handle bar 10 made of a steel material.

Here, the kind of the handle bar 10 of the bicycle includes the flat bar form (including a riser bar form and an H-like bar form) and the drop bar form (including a bullhorn bar form and a moustache bar form) as shown in FIG. 9. The turn signal lamp according to the present invention may be applied to the flat bar form A as it is, and the turn signal lamp according to the present invention may be applied to the drop bar form B via a multi-link.

That is, when the LED part 6 of the present invention is installed at a back mirror, or is applied to the drop bar form, the LED part may be configured to be mounted via a separate multi-link.

The battery part 12 is inserted into an inner side of the grip part 11 so that power can be supplied to each part. The constitutive elements from the battery part 12 to the cover 16 are integrally formed so that the battery can be charged via a general charging means by opening the cover 16 to separate the battery part 12.

Also, a power terminal is installed in the inner side of the grip part 11 so that another power terminal of the battery part 12 can automatically come into contact with the power terminal of the inner side of the grip part 11 when the battery part 12 is inserted into the grip part 11, thereby enabling power supply.

As such, when the on/off key 1 of the key part 4 is pushed once in a state where the battery part 12 is inserted into the grip part 11 to be completely closely fixed to the inner side of the grip part 11 by rotating the cover 16, power is supplied from the battery part 12 to the LED part 6 and thus the LEDs 6*a*, 6*c* of the LED part 6 are turned on so that a beam can be emitted via the lighting part 14 installed at an outer side of the LED part 6.

Accordingly, the LED part 6 of the present invention may perform a day and night warning function, a driving state displaying function and a brake lamp function. When the turning on and off/accelerating or decelerating key is pushed by selecting a turning on and off/accelerating or decelerating function, the turning on and off function is changed to the accelerating or decelerating function. Thus, the LED part is slowly turned on and off from top to bottom upon deceleration, or is rapidly turned on and off in an opposite direction upon acceleration.

During the night, as a lamp of the LED part 6 is turned on, a wide width effect of the bicycle and a visual image effect for a stop signal and stability can be increased. Furthermore, as high luminance LEDs for controlling intensity are adopted on both sides of a front portion, the turn signal lamp for the bicycle capable to selecting a night lighting function may be provided.

That is, in the nighttime, when the on/off key of the key part 4 is pushed, as shown in FIG. 6, the LEDs 6*a*, 6*c* are turned on in the initial state, thereby serving as a side lamp, and when the user holds on to the handle brake 3*b*, the rear LED 6*c* is only turned on, thereby showing a brake state rearward.

Furthermore, when the turning on and off/accelerating or decelerating key 3 of the key part 4 is pushed once, the LEDs 6*a* are turned on and off by the control of the control part 5, thereby serving as a turn signal lamp. When the accelerating or decelerating key 3 is pushed by selecting the acceleration or deceleration function, the turning on and off function is changed to the acceleration or deceleration function so that the LEDs 6*a* can be sequentially turned on from top to bottom in order of A-B-C-D and can be divided into turn on and off speeds, and at the same time, the LED can also enable a buzzer to generate a suitable signal sound according to each circumstance by being linked with the buzzer.

Hand signals generally used upon riding a bicycle are applied to a selective turning on or off of the LED part 6 of the present invention as shown in FIG. 6. As shown in FIG. 8, a left turn sign is indicated with the left hand, a right turn sign is indicated with the right hand, a stop sign is indicated by raising the right hand upwards, and a deceleration sign is indicated by repeatedly waving the right hand upwards and downwards.

Also, when the headlamp key 3*d* of the key part is pushed as needed, the high luminance LED 6*b* is turned on, thereby serving as a head lamp that illuminates the front. The high luminance LED 6*b* may be configured such that about two or three radiation intensity control-type LEDs are installed at the front.

FIG. 7 shows a state of the LED part 6 according to each case of FIG. 6. That is, (A) of FIG. 7 shows the LED part as viewed from the front, (B) shows the LED part as viewed by a person who rides the bicycle, and (C) shows the LED part as viewed from the rear.

When the person who rides the bicycle looks at the LED part 6, the LED part is configured to be in a state as shown in (B), thereby enabling the prevention of glariness.

In particular, in the present invention, in a case where the people ride each bicycle as a group, each LED part 6 may be installed to emit a specific beam having the same color so that the group can be distinguished from other riders or groups, and riding can be entirely controlled and led, thereby enabling stable group riding.

Furthermore, the LED part may be also installed to emit a beam to a side direction (left and right directions) of the handle bar.

Here, the speaker 8 is integrally installed with the cover 16 and is connected to the substrate 13 installed between the battery part 12 and the LED part 6 so that a signal transmitted from the portable repository inserting part 9 resulting from the control of the control part 5 can be outputted via the speaker 8.

Furthermore, as shown in FIG. 5, the charging terminal 1a capable of charging a mobile device is installed at an outer side of an end of the cover 16. Thus, when a user who rides the bicycle wants to charge his or her discharged mobile device, the mobile device can be charged by inserting a connection jack for recharge into the charging terminal 1a and by using a power source of the battery part 12.

Also, since the portable repository inserting part 9 is installed at one side of the charging terminal 1a of the cover 16, when the user inserts a memory into the portable repository inserting part 9 in an on state of the output key 2, he or she can listen to desired music via the speaker 8.

Meanwhile, in a case where it is intended to simply ride the bicycle in a stop state of all the functions, power is blocked when the key is pushed once again in an on state of the on/off key 2 of the key part. Thus, as the LED part 6 is turned off, other memory functions, a music outputting function and the like are stopped.

As shown in FIG. 5, the turn signal lamp of the present invention may be used in a state in which the grip part 11 is fixed to the handle bar 10 of the bicycle, or may be used in a state of being detachably inserted into an existing handle so as to perform various functions, thereby enabling the user to ride the bicycle conveniently and stably upon riding the bicycle.

Meanwhile, as described above, the turn signal lamp of the present invention may be applied to the handle bar of the bicycle and may enable the execution of general functions by installing the LED part 6 of the present invention at a back mirror (rear view mirror).

A second exemplary embodiment of the present invention will be hereinafter described.

Figure 10:
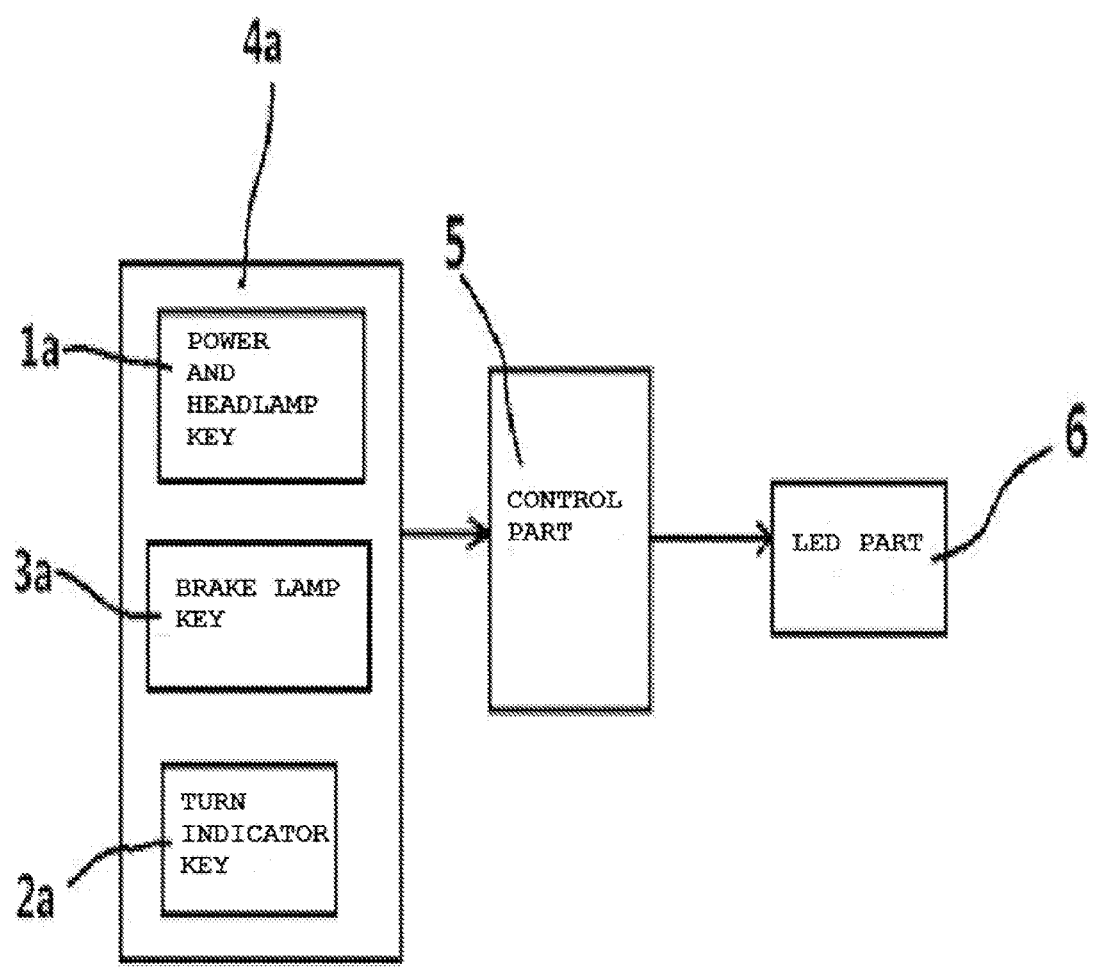
FIGS. 10 to 27 show a second exemplary embodiment of the present invention, namely.

FIG. 10 shows a key part 4a according to the second exemplary embodiment. A power and headlamp key 1a, a turn indicator key 2a, and a brake lamp key 3a constitute one key part 4a, and are configured to control turning on or off of the LED part 6 via the control part 5 according to a key signal of the key part 4a.

Figure 11:
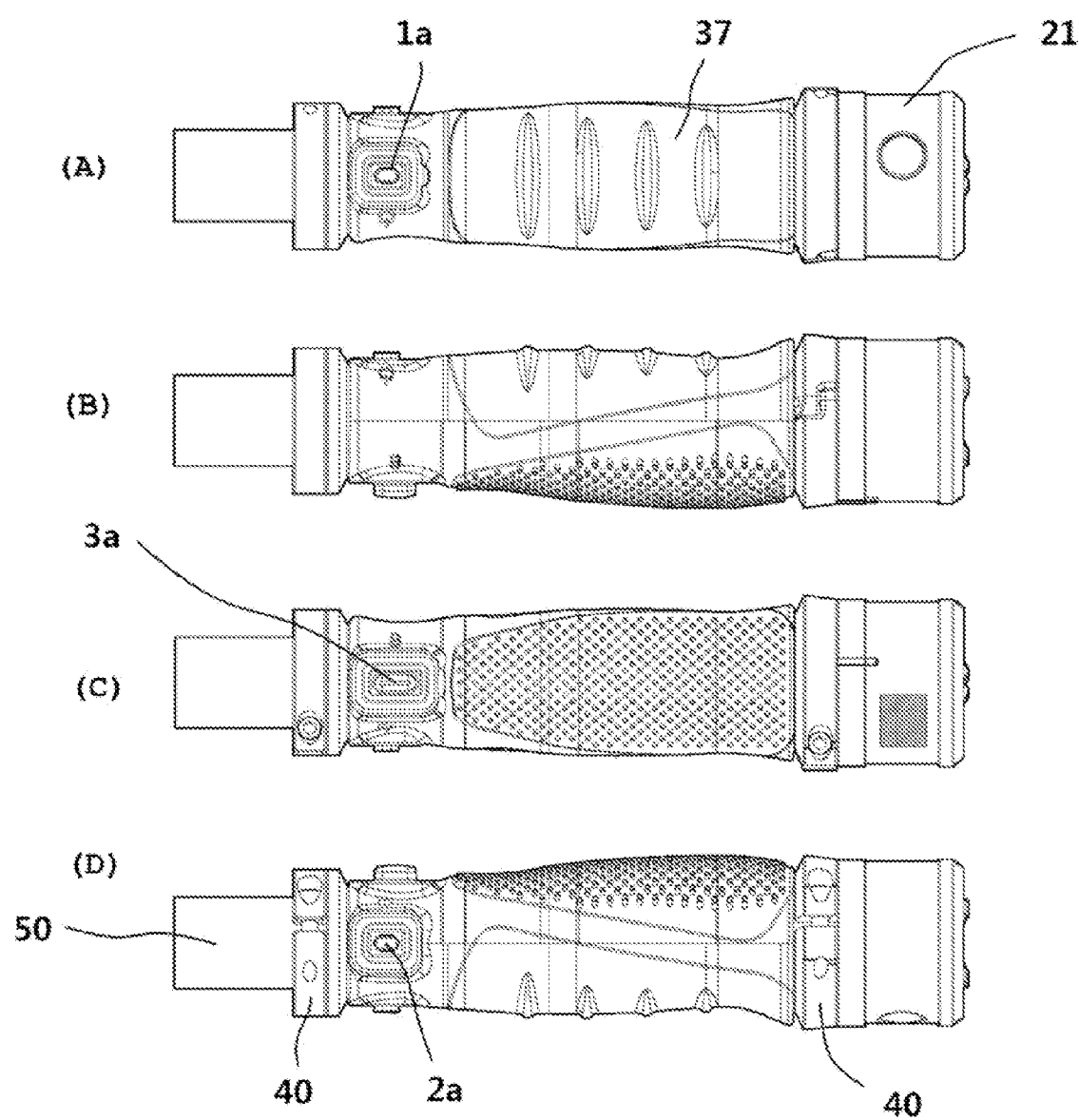
Figure 12:
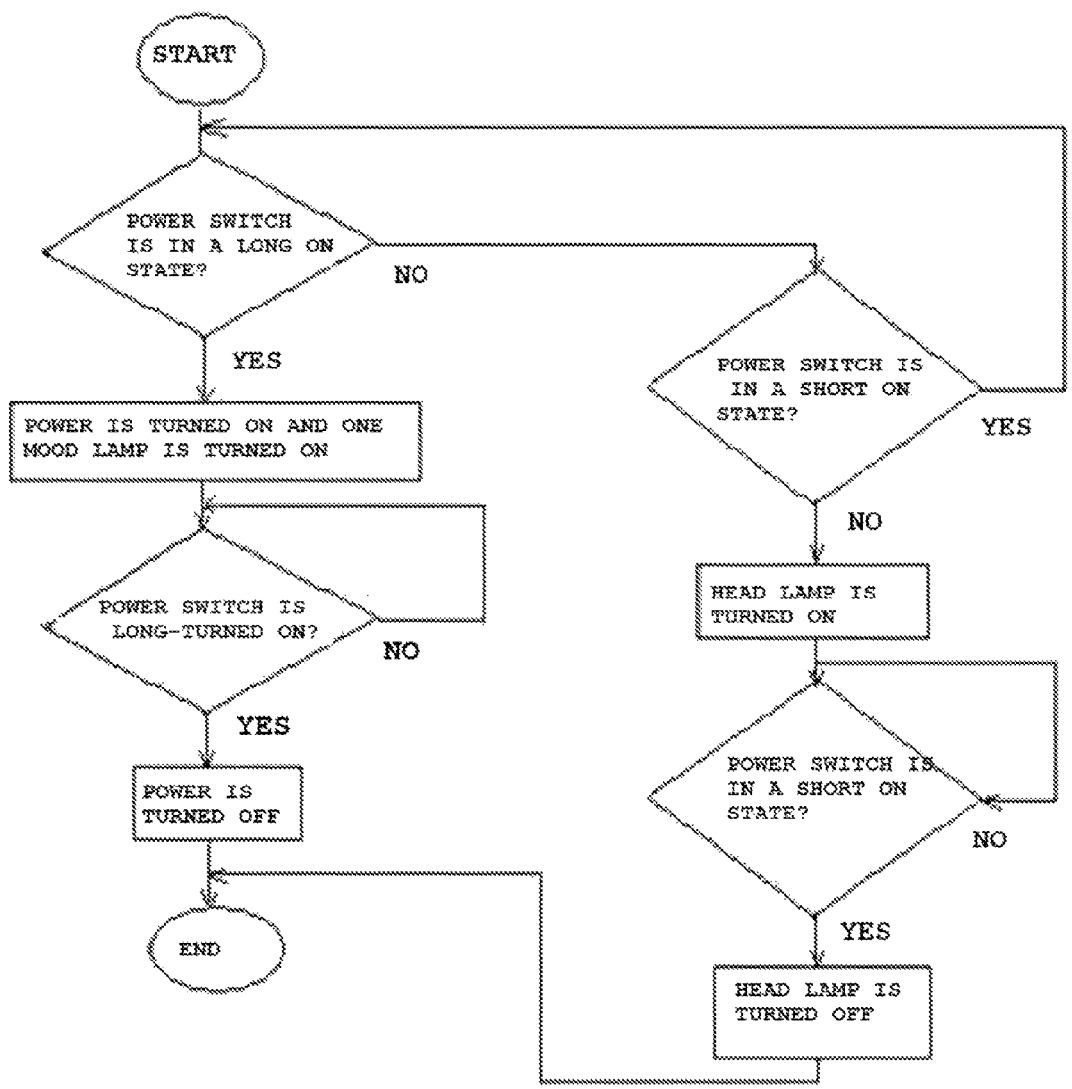

FIG. 11 is a view illustrated for explaining an operational state of the key part 4a installed at a grip part 37. (A) and (B) show a state in which a head lamp is turned on upon operating of the power and headlamp key 1a. When the headlamp key is long-pushed, the power source is turned on, one mood lamp along with the head lamp is turned on. When the headlamp key is long-pushed once again, the power source is turned off.

Also, in a case where it is intended to turn on and off the head lamp, the head lamp is turned on when the headlamp key is short-pushed, and the head lamp is turned off when the headlamp key is short-pushed once again.

(C) of FIG. 11 shows an operational state of the brake lamp key 3a. When the brake lamp key is short-pushed, the brake lamp is turned on for 5 seconds and is then turned off. Meanwhile, when the brake lamp key is continuously pushed, the brake lamp is continuously turned on, and when the pushing state of the brake lamp key is released, the brake lamp is turned off.

Here, the turn signal lamp of the present invention has a charge displaying function operated in such a manner that about one LED of the LED part 6 is turned on upon charging, thereby displaying charging.

(D) of FIG. 11 shows an operational state of the turn indicator key 2a. In a case where the turn signal lamp servers as a turn indicator, when the turn indicator key is short-pushed, the turn indicator flickers for 5 to 10 seconds and is then turned off. In a case where the turn signal lamp servers as a mood lamp, when the turn indicator key is long-pushed once, three mood lamps are turned on, and when the turn indicator key is long-pushed once again, three mood lamps are turned off.

Four LEDs of the LED part 6 of the lighting part 21 are simultaneously turned on and off according to control of the control part 5 upon operating of the turn indicator key 2a.

Here, grooves having a regular depth are formed at both ends of the grip part 37 made of a rubber material, and a clamp 40 is mounted to each of the grooves. Thus, when the clamp is coupled in a state where the grip part 37 is inserted into the handle bar 50 of the bicycle, the grip part 37 made of the rubber material is firmly tightly fixed to the handle bar 50 of the bicycle by the clamp 40.

Figure 13:
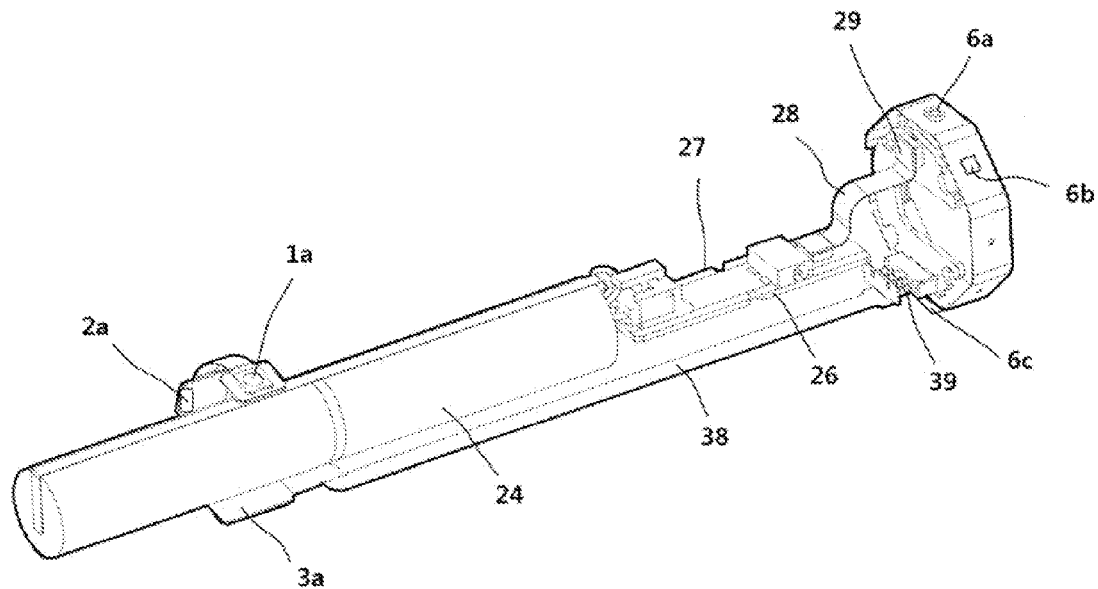

FIG. 13 is a view illustrated for explaining each combination structure of the inside of the grip part 37 of the present invention. Reference numerals 38, 26, 27, 28, 29, 6a, 6b and 6c refer to a flexible printed circuit board (FPCB), a DC jack, a protection circuit module or board (PCM or PCB), an FPCB controlling part, a PCB controlling part, a flash LED, an LED for a turn indicator, and a brake LED, respectively.

Figure 14:
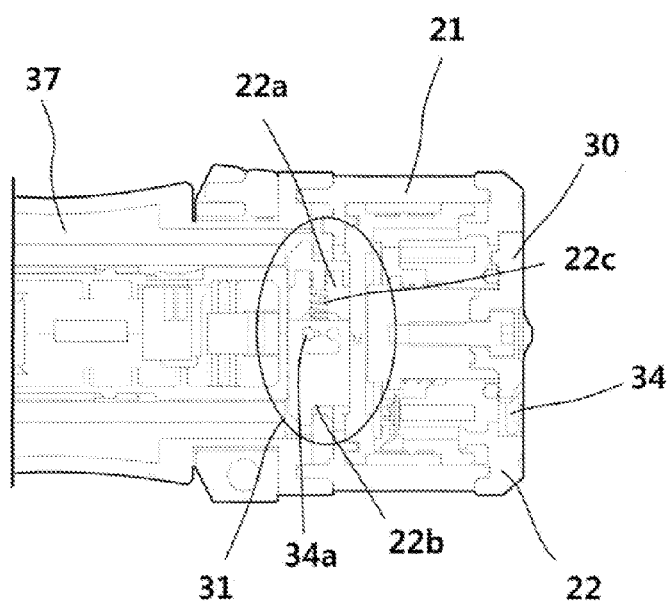
Figure 15:
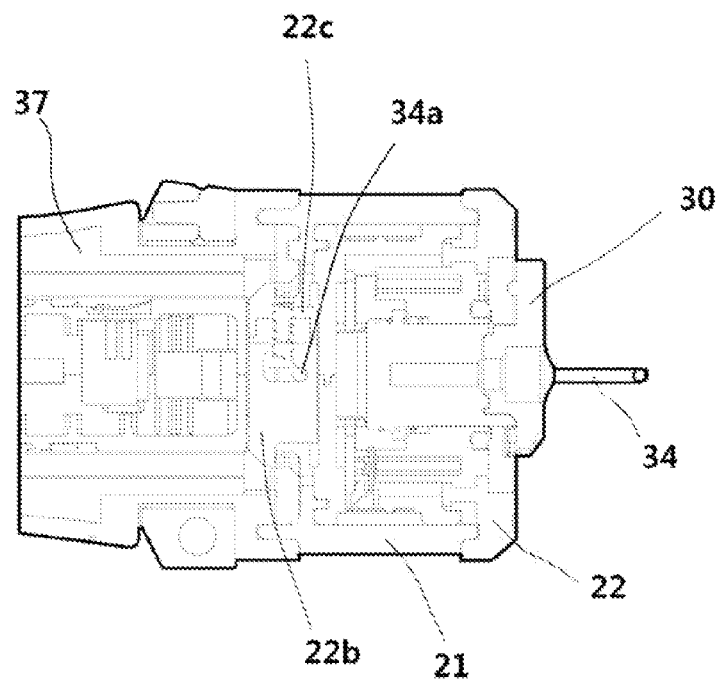

FIG. 14 shows a hook locking state and FIG. 15 shows a hook unlocking state. In a case where it is intended to separate a module 22 from the grip part 37, when pulling a ring 34 to the right after bending the ring 34 back as shown in the drawing, a locker part 30 connected to the ring 34 is pulled, a pin 34a is moved to the right in a horizontal direction so that a projection part of a hook top 22a/hook bottom 22b drops out, thereby causing movement to the center, thereby enabling the module 22 to be separated from the grip part 37.

That is, when the pin 34a is moved to the right, the hook top 22a is moved downwards, and the hook bottom 22b is moved upwards due to the property of a triangular structure of the inside of the hook bottom 22b and the hook top 22a, so that the module 22 is separated from the grip part 37.

At this time, a spring 22c elastically installed between the hook top 22a and the hook bottom 22b is in a compression state.

Then, when the module is connected to the grip part 37 again, the hook top 22a and the hook bottom 22b are returned to each original position due to a restoring force of the spring 22c, and the module 22 is firmly connected to the grip part 37 due to the projection part.

Figure 16:
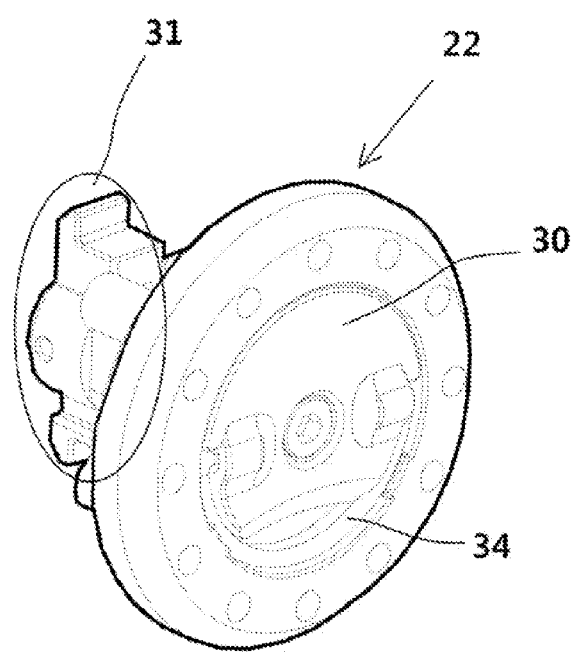
Figure 17:
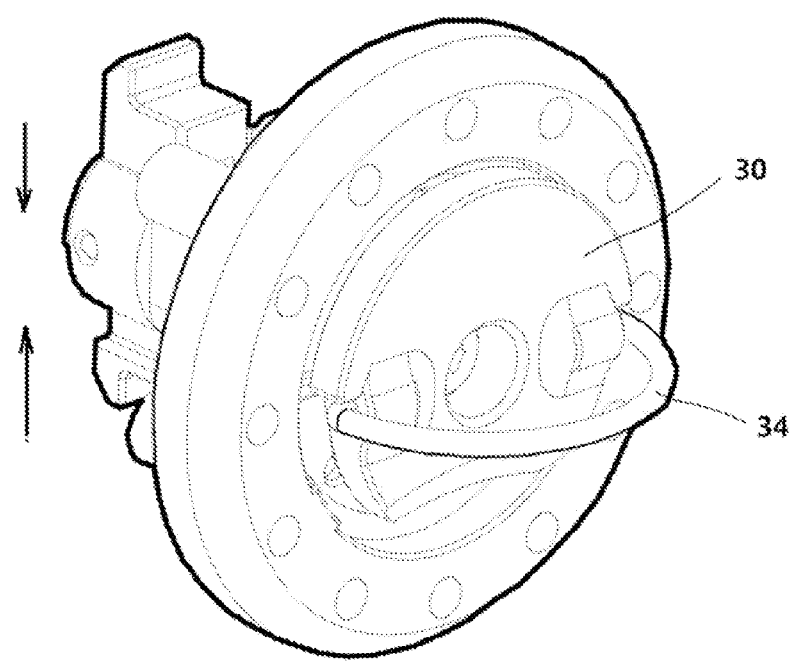

FIGS. 16 and 17 show a lock assembly structure. The pin 34a is in a locking state in a case where the ring 34 is inserted into the pin as shown in FIG. 14, and the pin 34a is in an unlocking state in a case where the ring 34 is pulled as shown in FIG. 17.

That is, when pulling the ring 34 after bending the ring to the right, a hook 31 is moved upwards and downwards as the direction of an arrow, the locking state is released.

Figure 18:
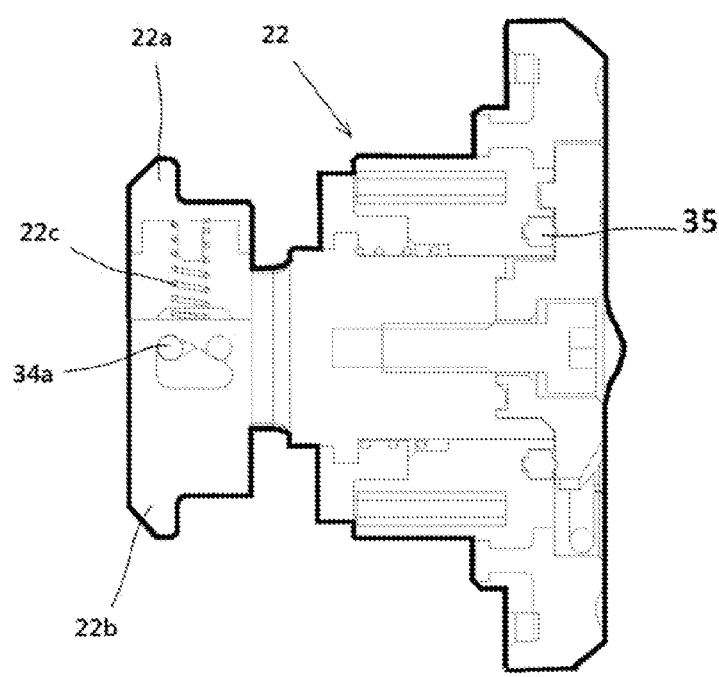

FIG. 18 shows a waterproof structure with regard to the lock assembly structure. For waterproof, an O-ring 35 is installed at an inner side of the module 22.

Figure 19:
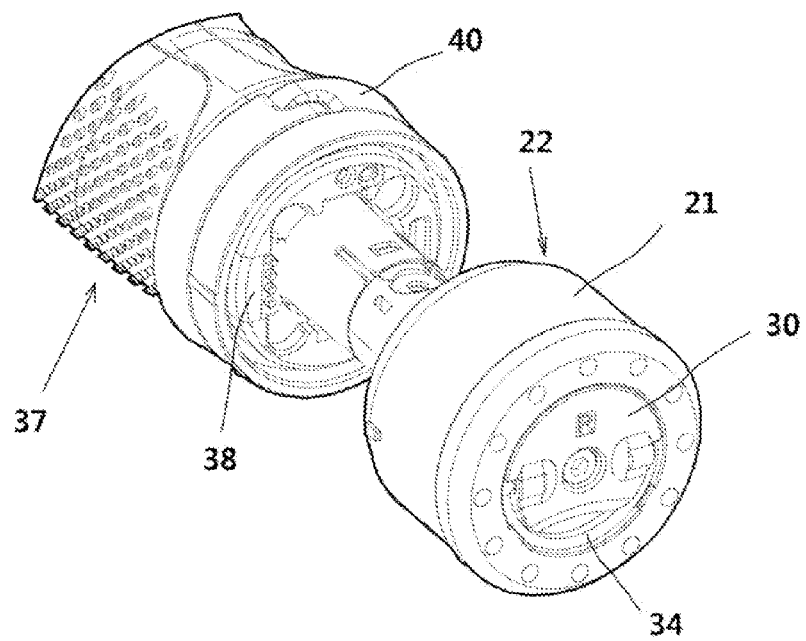
Figure 20:
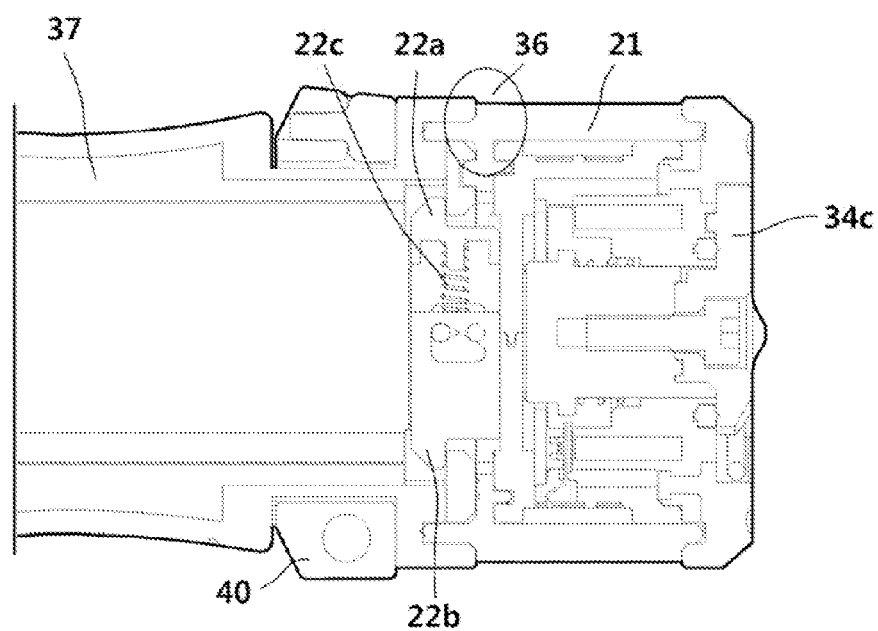

FIGS. 19 and 20 show a waterproof structure. Since the grip part 37 is made of a rubber material, the waterproof structure is formed upon performing a connection of the grip part with the clamp 40. The rubber material and the plastic material enable a waterproof function because these materials enable an assembly process to be performed without a gap or connection portions to overlap.

Figure 21:
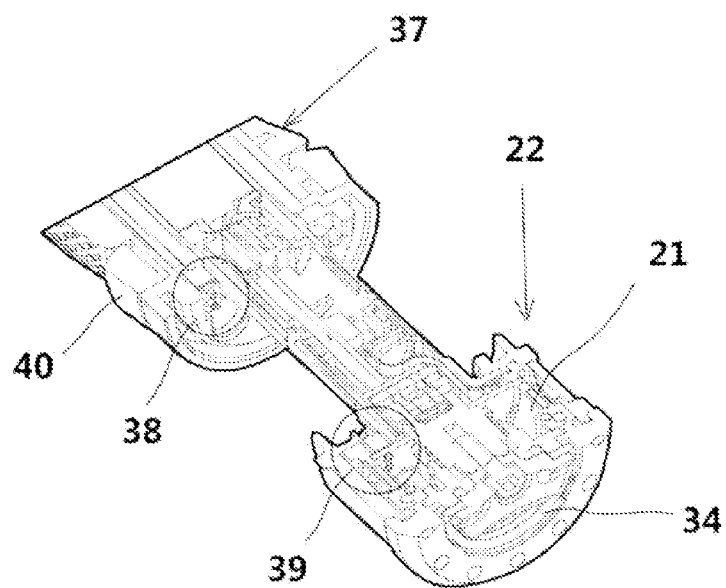

FIG. 21 shows a connection structure of the grip part 37 and the module 22.

When the module 22 is attached to or detached from the grip part, a projection structure of the FPCB 38 and a pogo pin 39 enables the module to be attached to or detached from the grip part. The grip part and the module are electrically connected to each other so that signals can be transmitted or received.

FIG. 21 shows a connection structure of the grip part 37 and the module 22 which is configured so as to be attached or detached by a projection structure of the FPCB 38 and the pogo pin 39

That is, the grip part is connected to a circuit of the module 22 via the FPCB 38 and the pogo pin 39 upon operating of functional buttons of the grip part 37, thereby performing a function via the lighting part 21.

Figure 22:
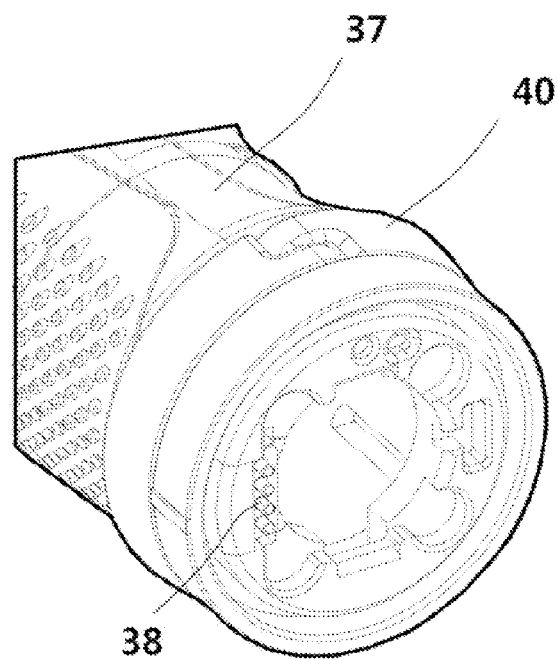
Figure 23:
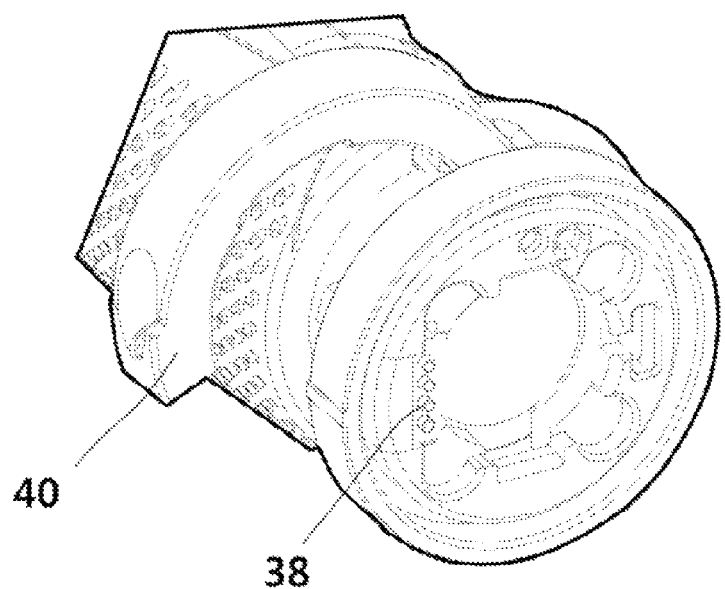

FIGS. 21 and 22 show a coupling structure of the clamp of the grip part 37 according to the present invention. The grip part 37 may be firmly coupled to the handle bar 50 made of steel of the bicycle using a means for separating an end of the clamp 40 or pressing and fixing the end of the clamp. Also, the clamp 40 may be coupled using a screw.

Figure 24:
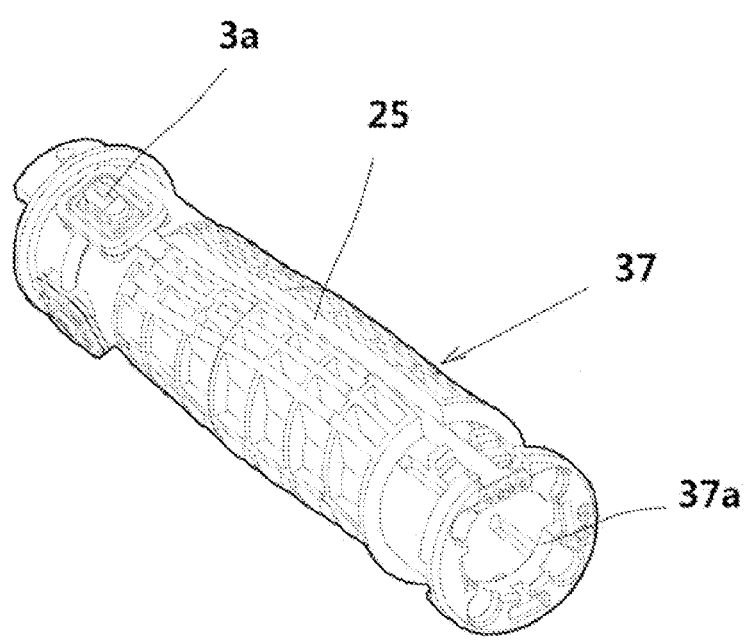

FIG. 24 shows an insert molding structure in which the FPCB is applied to the grip part 37 of the present invention. The insert molding structure is formed by forming a groove in a molded grip 37a to insert the FPCB 38 into the molded grip 37a for enabling an electrical connection with each key of the key part 4a, and by molding the grip part 37 thereon.

As shown in FIG. 1, the brake lamp key 3a in the FPCB 38 is also connected to the power and headlamp key 1a and the turn indicator key 2a constituting the key part 4a.

Figure 25:
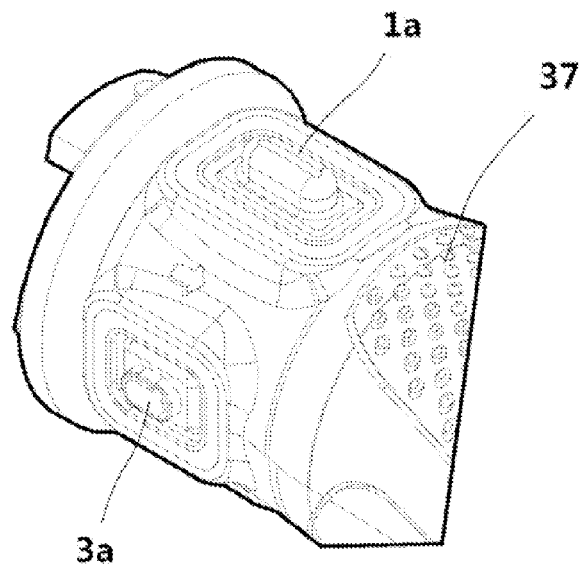

FIG. 25 is intended to explain an assembly structure of the key part 4a installed at the grip part 37 of the present invention. As the power and headlamp key 1a, the turn indicator key 2a and the brake lamp key 3a are installed in an inner side of the rubber cover, each key is pushed by a means pressing the rubber cover, thereby enabling each lamp to be turned on.

Figure 26:
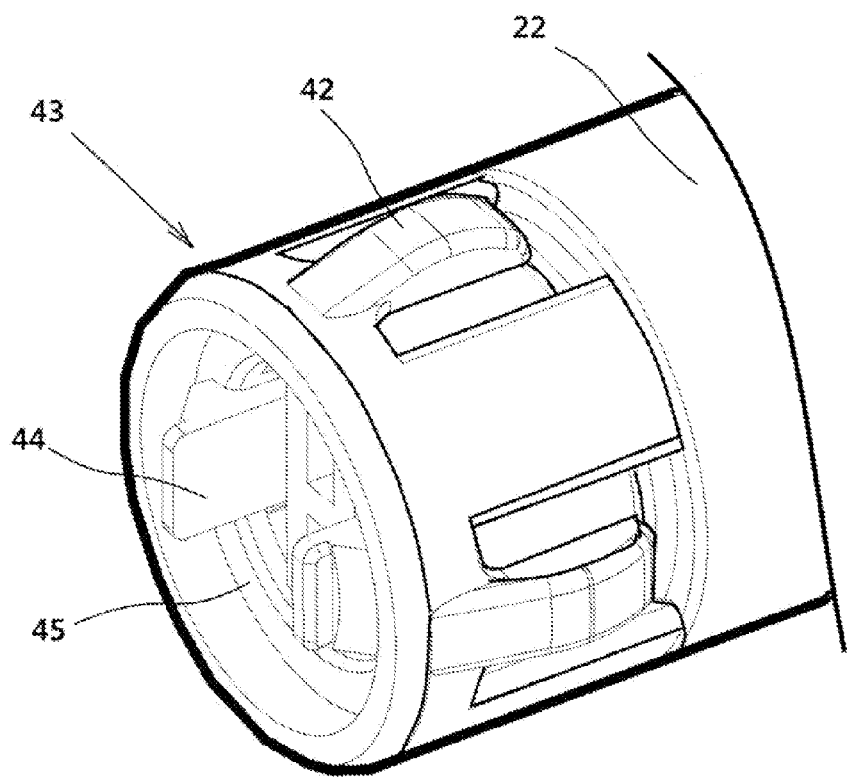

FIG. 26 shows a circular ring 43 in which elastic pieces are formed in a side opposite to the module 22. When the grip part 37 of the present invention is insertedly connected to the handle bar 50 of the bicycle, hooks 44 integrally formed with the module 22 are insertedly connected to a projection part 45 of an inner side of the circular ring 43. In such a state, the multiple elastic pieces 42 of an outer side of the circular ring 43 stretch or shrink elastically according to a thickness of the handle bar 50 of the bicycle so that the grip part can be firmly connected to the handle bar, thereby enabling the module 22 to be tightly fixed to the handle bar 50 of the bicycle.

A third exemplary embodiment of the present invention will be hereinafter described in detail with reference to FIGS. 27 to 30.

Figure 27:
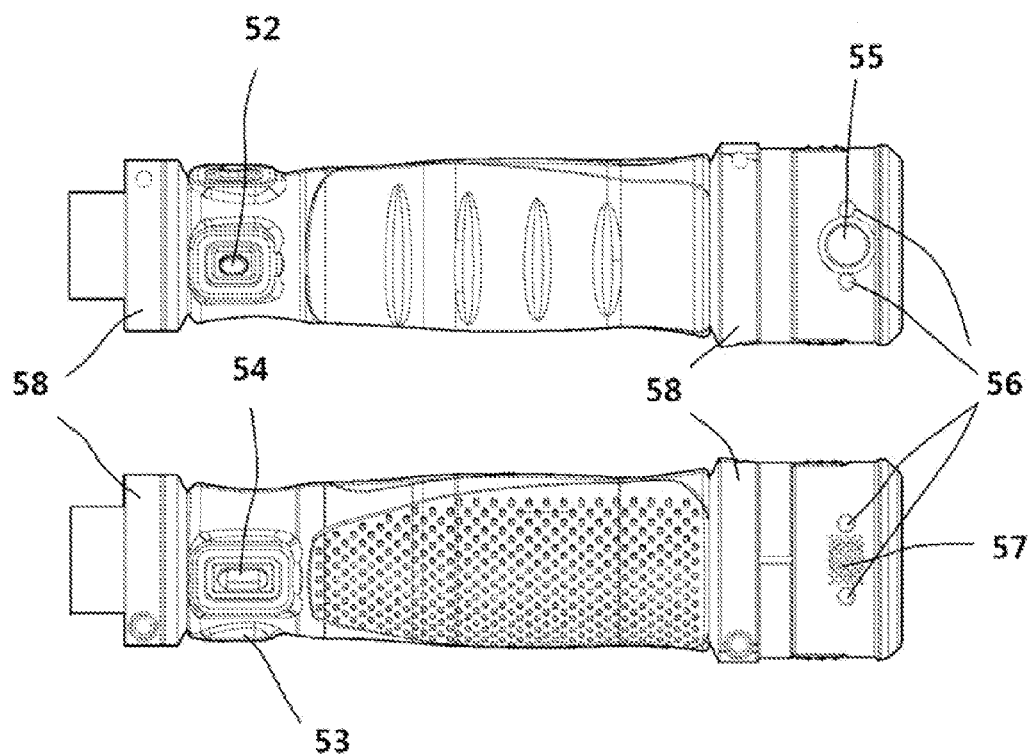

FIG. 27 shows an appearance of the grip part 51 of the present invention. The key part includes a power and headlamp key 52, a turn indicator key 53, and a brake lamp key 54. Turning on or off of a head lamp 55, a turn indicator 56 and a brake lamp 57 composed of LEDs is controlled via the control part (not drawn) according to a key signal of the key part.

Reference numeral 58, which is not described in the drawing, refers to a clamp for firmly fixing the grip part 51 to the handle bar 59 of the bicycle by being installed at both ends of the grip part 51.

Reviewing an operational state of the key part, when the power and headlamp key 52 is long-pushed, power is turned on, and at the same time, one mood lamp is turned on. Meanwhile, when the power and headlamp key is long-pushed once again, power is turned off.

Also, in a case where it is intended to turn on or off the head lamp, the head lamp is turned on when the power and headlamp key is short-pushed, and the head lamp is turned off when the power and headlamp key is short-pushed once again.

Furthermore, reviewing an operational state of the brake lamp key 54, when the brake lamp key is short-pushed, the brake lamp is turned on for 5 seconds and is then turned off. When the brake lamp key is continuously pushed, the brake lamp is continuously turned on, and when the pushing state of the brake lamp key is released, the brake lamp is turned off.

Here, since the turn signal lamp of the present invention has a charge displaying function, one LED is turned off upon charging, thereby showing charge displaying.

Meanwhile, reviewing an operational state of the turn indicator key 53, when the turn indicator key is short-pushed for operating the turn indicator, the turn indicator flickers for 5 to 10 seconds and is then turned off. Furthermore, when the turn indicator key is long-pushed once for enabling a mood lamp function to be performed, three LEDs are turned on, and when the turn indicator key is long-pushed once again, three LEDs are turned off.

The multiple LEDs in the silicon cap 73 are simultaneously turned on and off according to control of the 210 control part upon operating the turn indicator key 53.

Here, a groove having a fixed depth is formed at both ends of the grip part 51 made of a rubber material, respectively. When coupling of the clamp 58 is performed in such a manner as to mount the clamp 58 to the groove and insert the grip part 51 into the handle bar of the bicycle, the grip part may be tightly fixed to the handle bar of the bicycle via the clamp 58 because the grip part 51 is made of the rubber material.

Figure 28:
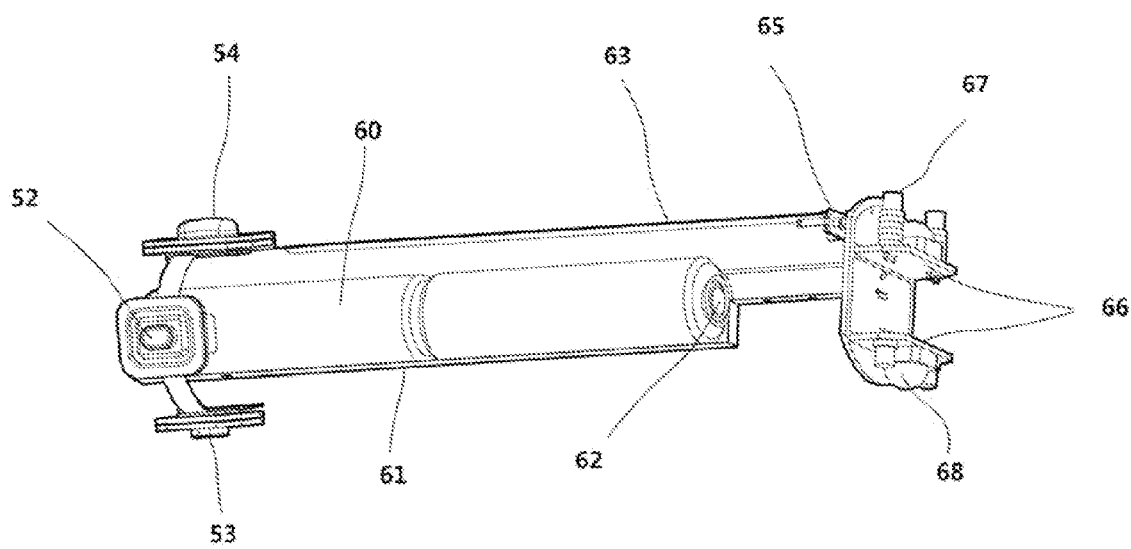

FIG. 28 is a view illustrated for explaining a configuration of the inside of the grip part 51 according to the present exemplary embodiment. The grip part includes: a general battery 60 for supplying a power source; three keys 52, 53, 55; a negative terminal 61; a positive terminal 62; a flexible printed circuit board (FPCB) 63; a protection circuit module or board (PCM or PCB) 64; a pogo pin 65; an LED substrate 66; a plurality of LEDs 67; and another LEDs 68 installed to be opposite to the LEDs 67.

Figure 29:
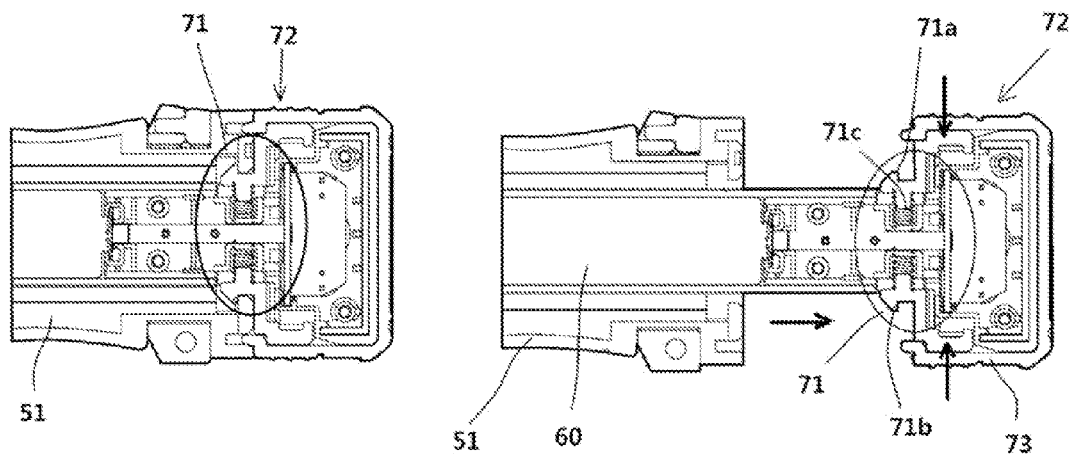
Figure 30:
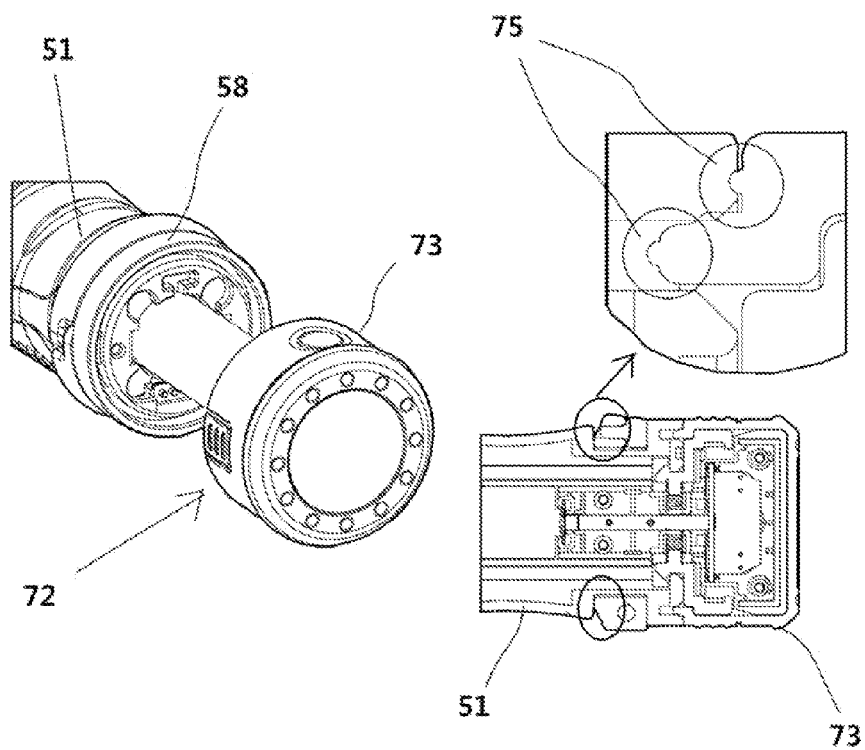

FIGS. 29 and 30 show a hook structure and a waterproof structure. The left view of FIG. 29 shows a hook lock state and the right view shows a state in which the module 72 is separated from the grip part 51 by unlocking of the hook.

In a case where it is intended to separate the module 72 from the grip part 51, when the upper and lower portions of the silicon cap 73 are held and pressed with the fingers, the upper and lower portions of the silicon cap 73 are pressed in the direction of an arrow, and the top hook 71a and the bottom hook 71b liked with a pressing portion are moved to the center.

Accordingly, the top hook 71a and the bottom hook 71b of the hook portion 71 are separated from the projection part, thereby occurring separation of the hook portion 71. Thus, the module 72 including the silicon cap 73 is entirely separated from the grip part 51 to the outside.

At this time, the spring 71c elastically installed between the hook top 71a and the hook bottom 71b is pressed by the hooks and thus is maintained in a compressed state.

Accordingly, as shown in FIG. 28, the battery 60 may be exchanged to a new battery in a state of the module 72 being separated from the grip part 51.

Then, when the module 72 is connected to the grip part 51 again, the hooks are moved upwards and downwards by a restoring force of the spring 71c compressed between the top hook 71a and the bottom hook 71c and are held by the projection part when the user separates his or her hand from upper and lower portions of the silicon cap 73 after connecting the hook portion 71 to the grip part 51 in a state of pressing the upper and lower portion, thereby enabling the module 72 to be firmly connected to the grip part 51.

FIG. 30 shows a waterproof structure of the present invention. Two portions where the silicon cap 73 and the grip part 51 come into contact with each other are formed to have a waterproof structure 75 so that water can be prevented from sinking into the module 72.

That is, the grip part 51 made of a rubber material is configured to overlap with an end of the silicon cap 73, thereby performing a waterproof function.

Meanwhile, when a key of the grip part 51 is operated, a power source of the battery 60 is supplied to LEDs 67, 68 via pogo pin 65 and via the FPCB 63 and a negative terminal 11 and a positive terminal 62 so that the corresponding LEDs can be turned on or off according to the operation of the key.

Here, the LED 67 and LED 68 are installed to be opposite to each other so that the LED 67 can serve a head lamp 5, and the LED 68 can serve as a brake lamp.

Furthermore, by turning on or off of other LEDs arranged around the LEDs 67, 68, the other LEDs serve as the turn indicator 56 so as to display a direction upon riding of the bicycle.

Description of the Reference Numerals in the Drawings

| | |
|---|---|
| 1: On/off key | 2: Output key |
| 3: Turning on and off/accelerating or decelerating key | |
| 4, 4a: Key part | |
| 5: Control part | 6: LED part |
| 7: Buzzer | 8: Speaker |
| 9: Portable repository inserting part | 10: Handle bar |
| 11, 37: Grib part | 12: Battery part |
| 13: Substrate | 14, 21: Lighting part |
| 16: Cover | 17: O-ring |
| 22: Module | 24: Battery |
| 38: FPCB | 26: DC jack |
| 27: PCB or PCM | 28: FPCB control part |
| 29: PCB control part | 30: Locker part |
| 31, 44: Hook | 34: Ring |
| 37: Grip part | 39: Pogo pin |
| 40: Clamp | 42: Elastic pieces |
| 43: Circular ring | 45: Projection part |

The invention claimed is:

1. A multi-functional turn signal lamp for a bicycle, comprising:
   a grip part installed at an end portion of a handle bar of the bicycle and having a key part composed of a power and headlamp key, a turn indicator key and a brake lamp key;
   a module detachably attached to the grip part via a hook;
   a battery part embedded in the grip part to be electrically connected to a terminal;
   an FPCB (Flexible Printed Circuit Board) and a PCM or PCB (Protection Circuit Module or Board) for electrically connecting the battery part and an LED part composed of flash LEDs, a turn indicator LED, a brake LED;
   a lighting part installed at the module to illuminate a beam of the LED part in all directions; and
   a ring installed at an end of the module to enable the hook to be turned on or off.

2. The multi-functional turn signal lamp of claim 1, wherein a locker part is also pulled when the ring is pulled, and at the same time, a pin is horizontally moved so that a hook top and a hook bottom of the hook can be moved to the center, thereby enabling the module to be separated from the grip part.

3. The multi-functional turn signal lamp of claim 2, wherein an O-ring for waterproof is installed in an inner side of the module.

4. The multi-functional turn signal lamp of claim 1, wherein an O-ring for waterproof is installed in an inner side of the module.

5. The multi-functional turn signal lamp of claim 1, wherein an FPCB (Flexible Printed Circuit Board) and a pogo pin are connected to each other upon connecting the grip part and the module so that signals can be transmitted or received.

6. The multi-functional turn signal lamp of claim 1, wherein a clamp is installed at both ends of the grip part so that the grip part can be firmly connected to the handle bar of the bicycle via a means for attaching or detaching the clamp.

7. The multi-functional turn signal lamp of claim 1, wherein a pair of hooks is formed at an end of the module, and a projection part is formed in an inner side of a circular ring in which multiple elastic pieces are formed at an outer side so that the hooks can be insertedly fixed into the projection part, and the elastic pieces can be elastically connected according to a thickness of the handle bar of the bicycle.

8. The multi-functional turn signal lamp of claim 1, wherein a charging terminal capable of charging a portable device and a portable repository inserting part are installed at the key part.

9. The multi-functional turn signal lamp of claim 1, wherein the LED part is installed at a back mirror, or the LED part is configured to be mounted via a multi-link in the case of a drop bar form.

* * * * *